(12) United States Patent
Dal Pra'

(10) Patent No.: US 6,676,554 B2
(45) Date of Patent: Jan. 13, 2004

(54) ELECTRICALLY POWERED ACTUATOR FOR A BICYCLE COMPONENT

(75) Inventor: Giuseppe Dal Pra', Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 09/953,285

(22) Filed: Sep. 17, 2001

(65) Prior Publication Data

US 2003/0060314 A1 Mar. 27, 2003

(51) Int. Cl.[7] .......................... F16H 48/06; B62K 11/00
(52) U.S. Cl. ........................................ 475/149; 180/205
(58) Field of Search ........................ 475/149; 474/103; 280/238; 180/205, 206, 207, 65.5, 65.6

(56) References Cited

U.S. PATENT DOCUMENTS

| | | | |
|---|---|---|---|
| 4,800,766 A | * 1/1989 | Isozumi et al. | ......... 475/149 X |
| 5,098,063 A | * 3/1992 | Ronzon | ...................... 137/554 |
| 5,144,275 A | * 9/1992 | Sebastian et al. | .............. 338/67 |
| 5,269,733 A | * 12/1993 | Anthony, III | ........... 475/149 X |
| 5,480,356 A | * 1/1996 | Campagnolo | ........... 475/103 X |
| 6,080,075 A | * 6/2000 | Wussow et al. | ............. 475/149 |
| 6,255,751 B1 | * 7/2001 | Hoffmann | ............... 475/149 X |
| 6,428,442 B1 | * 8/2002 | Turgay et al. | .......... 475/149 X |

* cited by examiner

Primary Examiner—Roger Pang
(74) Attorney, Agent, or Firm—Volpe and Koenig, P.C.

(57) ABSTRACT

Electrically powered actuator, particularly for controlling a bicycle component, for example a front or rear bicycle derailleur, comprising an electrical motor with an output shaft, a driven shaft rotationally mounted in the casing of the actuator and connected to the output shaft of the electrical motor by means of a reducer, and a angular position sensor of said driven shaft, incorporated inside said actuator casing, consisting of a rotary potentiometer.

19 Claims, 2 Drawing Sheets

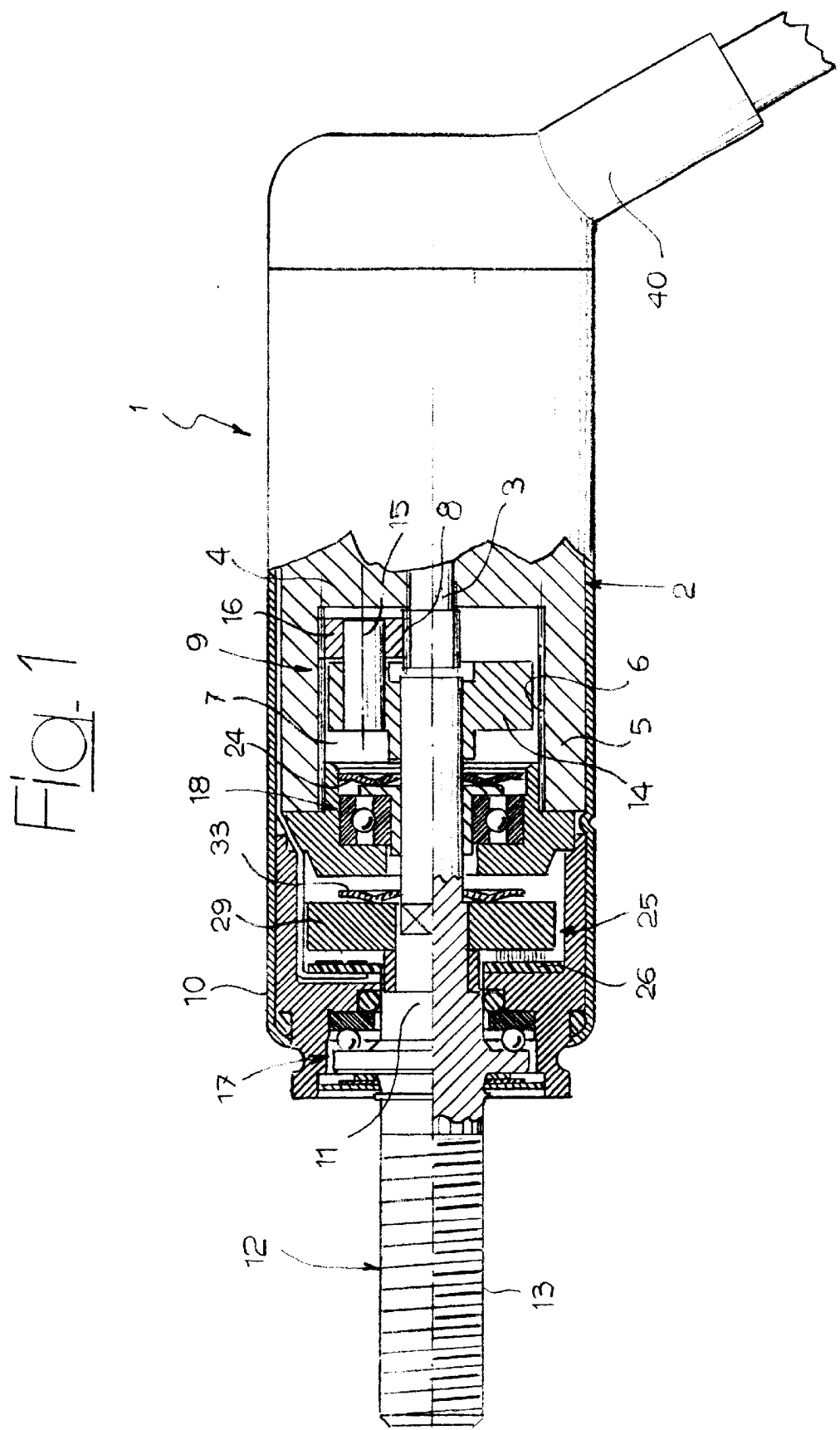

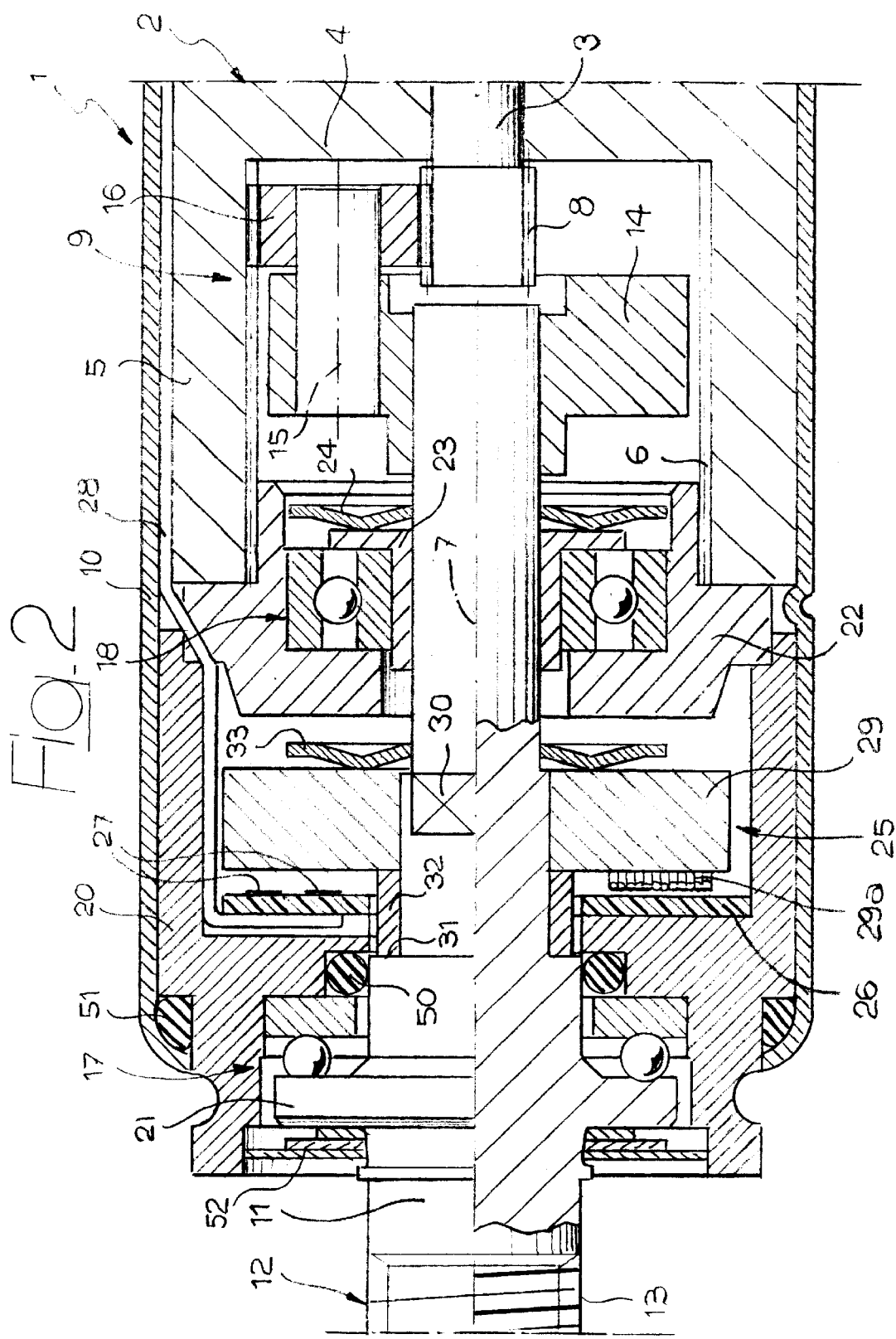

ELECTRICALLY POWERED ACTUATOR FOR A BICYCLE COMPONENT

BACKGROUND OF THE INVENTION

This invention relates to an electrically powered actuator, particularly for controlling a bicycle component, for example a front or rear bicycle derailleur, of the type comprising:

an electrical motor with an output shaft, a driven shaft rotationally mounted in the casing of the actuator and connected to the output shaft of the electrical motor by means of a reducer, and a angular position sensor of said driven shaft.

An actuator of the type above is described and illustrated in U.S. Pat. No. 5,480,356 by the Applicant. In this known solution, said driven shaft angular position sensor consists of an encoder, comprising an optical or magnetic reader which co-operates with a plate connected to the driven shaft. Again in this known solution, the actuator is used to control the rear derailleur of a bicycle comprising an articulated parallelogram linkage with the actuator arranged along a diagonal of the parallelogram. The driven shaft is connected to a screw, which engages a worm screw pivotally mounted on one of the vertexes of the parallelogram linkage, so that the rotation of the driven shaft causes the diagonal of the parallelogram linkage to lengthen or shorten, consequently changing the geometry of the parallelogram linkage and shifting the mobile part of the derailleur, which shifts the chain of the bicycle on a plurality of sprockets associated to the hub of the rear wheel of a bicycle. In the past, the Applicant also proposed to use an actuator of the type specified above to control a front bicycle derailleur. In this case, the actuator is connected either directly, or via a transmission, to a lever, which is an integral part of the body formed by one of the arms of the front derailleur parallelogram linkage.

The Applicant also proposed a derailleur (front or rear) of a bicycle equipped with an electrical actuator of the type described above and comprising, instead of the encoder described above, an absolute electrical transducer, typically a rotary potentiometer, associated to said derailleur, for example in position corresponding to one of the articulations of the derailleur parallelogram linkage described in U.S. patent application Ser. No. 09/716,236, filed Nov. 21, 2000.

The objective of this invention is to additionally perfect the previous proposal, making an electrically powered actuator, preferably usable for controlling a bicycle derailleur, but however susceptible of general application, which is distinguished for its elevated characteristics of simplicity and functionality.

SUMMARY OF THE INVENTION

In order to attain this objective, this invention refers to an electrically powered actuator, particularly for controlling a bicycle component, for example a front or rear bicycle derailleur, comprising:

an electrical motor with an output shaft, a driven shaft rotationally mounted in the casing of the actuator and connected to the output shaft of the electrical motor by means of a reducer, and a angular position sensor of said driven shaft, characterised in that said sensor is a rotary potentiometer associated with said driven shaft inside said actuator casing.

In the preferred form of embodiment of the invention, the reducer is, according to a known technique, an epicyclic reduction gear, comprising an internal gear rigidly connected to the body of the motor, a sun gear connected to the output shaft of the motor coaxially inside the internal gear and a gear set holder rotationally connected to the driven shaft and holding at least one satellite gear freely turning on an axis distanced from the common axis of the sun gear and internal gear, said satellite meshing both the sun gear and the internal gear. The driven shaft is rotationally mounted in a tubular casing projecting from an end of the motor body. Furthermore, the driven shaft is rotationally mounted in said casing by means of at least one rolling bearing of the thrust bearing type. Preferably, the driven shaft is rotationally mounted by means of said thrust bearing and by means of an additional radial ball bearing.

The potentiometer equipping the actuator according to this invention comprises a fixed plate carrying electrical contact tracks on a radial ring side which is fixed which respect to said casing, and at least one sliding contact on the fixed place connected to the driven shaft. The sliding contact is carried by a plate rotationally connected to the driven shaft and axially withheld against the shaft by means of a snap ring mounted on the driven shaft.

Furthermore, seals for protecting from water infiltration are provided in the potentiometer area. According to an additional characteristic, said thrust bearing has a race directly formed on the driven shaft, which prevents axial movements of the driven shaft in a first direction, while the radial bearing is axially withheld by a snap ring mounted on the driven shaft, which prevents axial movement of the latter in a second direction, which is opposite to said first direction.

These constructive details are obviously referred to the preferred form of embodiment described in the accompanying drawings, providing that numerous changes can be implemented, all comprised within the context of the concept characterising this invention.

As illustrated, the actuator according to this invention is preferably usable for controlling the rear or front derailleur of a bicycle, but it can be applied to controlling any other component fitted aboard a bicycle, or any other application.

Consequently, this invention refers both to the actuator per se and, as illustrated in the preferred form of embodiment, to a bicycle transmission system comprising at least one front derailleur or one rear derailleur equipped with said actuator.

This invention will be better explained by the following detailed descriptions with reference to the accompanying figure as non-limiting example, whereas:

BRIEF DESCRIPTION OF THE DRAWINGS

FIG. 1 is a lateral partially cross-sectional view of a preferred form of embodiment of the actuator according to this invention and FIG. 2 is a view of a detail in FIG. 1 on a larger scale.

DETAILED DESCRIPTION OF THE INVENTION

With reference to the drawings, numeral 1 generally indicates an electrically powered actuator comprising an electrical motor 2 of any known type. The constructive details of the electrical motor 2 are not described herein, nor are they illustrated, because, as described, they can be made in any known way and since these details not are per se comprised within the context of the concept characterising this invention. Furthermore, the elimination of these details from the drawings makes understanding readier and simpler.

In the figures, numeral 3 indicates the output shaft of the electrical motor 2 one end of which projects from an end of the body 4 of the motor 2. Furthermore, the body 4 extends to form a tubular appendix 5, on which internal surface an internal gear 6 is formed. The axis 7 of the internal gear 6 coincides with the axis of the output shaft 3 of the electrical motor 2. A gear 8, forming the sun gear of an epicyclic gear set 9, is formed on the output shaft 3.

The body of the electrical motor 2 is contained inside a tubular casing 10, for example made of metallic sheet or plastic material, inside which a driven shaft 11 is rotationally mounted. The driven shaft 11 has an end portion 12 projecting from the casing 10 and destined to control, in any known way, the component controlled by the actuator 1. In the case described above of an actuator associated with the derailleur of a bicycle, the portion 12 is a portion carrying a threading 13 destined to engage a worm screw (not shown), connected to the controlled mechanism, for example, as described above with reference to the previous solutions proposed by the Applicant. The internal extremity of the driven shaft 11 carries a gear set holder 14 on which three satellite gears 16 meshing both the internal gear 6 and the sun gear 8 are rotationally mounted so to freely turn on axis 15, which are peripheral with respect to axis 7. Consequently, the epicyclic gear set 9 acts as a reducer, because it transmits the rotation from the output shaft 3 of the electrical motor 2 to the driven shaft 7 via the gear set holder 14 providing a reduction ratio.

As appears in detail in FIG. 2, the driven shaft 11 is rotationally mounted in casing 10 by means of two rolling bearings 17, 18. The bearing 17 is a ball bearing of the thrust bearing type, mounted on the end of the casing 10, from which the driven shaft 11 projects. The bearing 17 presents a first race 19 resting against a race stop in a tubular box 20 fastened within the casing 10, and a second race 21, firstly formed on the shaft 11, which thus prevents a rightwards movement of the driven shaft 11 (with reference to FIG. 2).

The bearing 18 is a radial ball bearing with a first outer race resting in a race stop of a bushing 22 fastened to the appendix 5 of the body of the motor. The inner race of the bearing 18, conversely, rests on the driven shaft 11 by means of a bushing 23 and is axially withheld against the bushing 22 by a metallic snap ring 24 connected by friction to the driven shaft 11, which thus prevents the leftwards movement of the driven shaft 11 (with reference to FIG. 2).

Furthermore, an angular shaft position sensor, generally indicated with numeral 25, is directly mounted on the driven shaft 11. The sensor 25 comprises an electrical rotary potentiometer. The potentiometer 25 presents a fixed plate with two concentric electrical tracks 27 leading to respective terminals carried by a flat conductor 28 leading to actuator power wire 40 (FIG. 1). Furthermore, the potentiometer 25 comprises a plate 29 rotationally connected (by means of a coupling on a flat surface 30) with a driven shaft 11 and axially withheld against a ring stop 31 and a tubular shim 32 by means of a metallic snap ring 33 of the type similar to plate 24, which is connected by friction to the driven shaft 11. The plate 29 holds the brushes 29a in sliding contact with the tracts 27 of the fixed plate 26, to reciprocally connect the tracks 27 in correspondence with a point of their circumferencial extension, which is according to the angular position of the plate 29 so to generate a signal indicating said angular position on the output wire 28.

Thanks to the characteristics described above, the actuator presents an extremely simple and compact structure and, at the same time, is capable of performing its function with extreme efficiency and of ensuring precise, reliable signalling of the angular position of the driven shaft 11, so to permit system controlling on behalf of an on-board computer.

Reference numeral 50 indicates a seal made of elastomer material radially interposed between the driven shaft 11 and the tubular casing 20, and axially between the thrust bearing 17 and the chamber containing the potentiometer 25 to prevent infiltration of water or foreign bodies in the potentiometer area. Reference numeral 51 indicates another seal made of elastomer material arranged on the end of the casing 10 from which the tubular casing 20. Finally, the actuator is provided with front ring seal partitions 52 on the mouth of the tubular box 20 from which the driven shaft 11 projects.

Naturally, numerous changes can be implemented to the construction and forms of embodiment of the invention herein envisaged, all comprised within the context of the concept characterising this invention, as defined by the following claims.

What is claimed is:

1. An electrically powered actuator for a bicycle component, the actuator comprising:
   a casing,
   an electric motor with a housing and an output shaft,
   a driven shaft rotationally mounted in said casing and connected to the output shaft of the electrical motor by means of a reducer, and
   an angular position sensor for detecting and signaling the angular position of said driven shaft, wherein said sensor is a rotary potentiometer associated with said driven shaft inside said casing,
   wherein the reducer is an epicyclic reduction gear, comprising an internal gear rigidly connected to the housing of the motor, a sun gear connected to the output shaft of the motor coaxially inside the internal sear and a sear set holder rotationally connected to the driven shaft and holding at least one satellite gear freely turning on an axis distanced from the common axis of the sun gear and internal gear, said satellite gear meshing with both the sun gear and the internal gear,
   wherein the driven shaft is rotationally mounted in a tubular casing projecting from an end of the motor body,
   wherein the driven shaft is rotationally mounted on at least one thrust ball bearing.

2. Actuator according to claim 1, wherein said driven shaft is rotationally mounted by means of said thrust bearing and by means of an additional radial ball bearing.

3. Actuator according to claim 1, wherein the potentiometer comprises a fixed plate carrying electrical contact tracks on a radial ring side which is fixed with respect to the motor body, and at least one sliding contact on the fixed plate connected to the driven shaft.

4. Acuator according to claim 3, wherein the sliding contact is carried by a plate rotationally connected to the driven shaft and axially withheld against the shaft by means of a snap ring mounted on the driven shaft.

5. Actuator according to claim 4, wherein seals for protecting the potentiometer from water infiltration are provided.

6. Actuator according to claim 2, wherein the thrust bearing has a race directly formed on the driven shaft, which prevents axial movements of the driven shaft in a first direction, while the radial bearing is axially withheld by a snap ring mounted on the driven shaft, which prevents axial movement of the latter in a second direction, which is opposite to said first direction.

7. Electrically powered actuator for controlling a bicycle derailleur, the actuator comprising:
- a casing;
- an electric motor with an output shaft;
- a driven shaft rotationally mounted in the casing of the actuator and connected to the output shaft of the electric motor by means of a reducer; and
- an angular position sensor of said driven shaft, wherein said sensor is a rotary potentiometer associated with said driven shaft inside said casing;
- wherein the potentiometer comprises a fixed plate carrying electrical contact tracks on a radial ring side which is fixed with respect to the motor body, and at least one sliding contact on the fixed plate connected to the driven shaft;
- wherein the sliding contact is carried by a plate rotationally connected to the driven shaft and axially withheld against the shaft by means of a snap ring mounted on the driven shaft.

8. The actuator of claim 7 wherein the potentiometer is sealed against water infiltration.

9. The actuator of claim 7, wherein the thrust bearing has a race directly formed on the driven shaft, which prevents axial movements of the driven shaft in a first direction, while the radial bearing is axially withheld by a snap ring mounted on the driven shaft, which prevents axial movement of the latter in a second direction, which is opposite to said first direction.

10. Electrically powered actuator for controlling a bicycle component, the actuator comprising:
- a casing;
- an electric motor having an output shaft;
- a driven shaft rotationally mounted on a thrust bearing in the casing and connected to the output shaft of the electric motor with an end thereof projecting from an end of the casing;
- a reducer connecting the driven shaft to the output shaft; the reducer being an epicyclic reduction gear comprising:
  - an internal gear rigidly connected to the body of the motor, a sun gear connected to the output shaft of the motor coaxially inside the internal gear and a gear set holder rotationally connected to the driven shaft and holding at least one satellite gear freely turning on an axis distanced from the common axis of the sun gear and internal gear, said satellite gear meshing with both the sun gear and the internal gear; and,
- a rotary potentiometer associated with said driven shaft inside said casing for sensing an angular position of said driven shaft.

11. The actuator of claim 10 wherein said driven shaft is rotationally mounted by means of said thrust bearing and an additional ball bearing.

12. The actuator according to claim 11 wherein the thrust bearing has a race directly formed on the driven shaft, which prevents axial movement of the driven shaft in a first direction, while the radial bearing is axially withheld by a snap ring mounted on the driven shaft, which prevents axial movement of the shaft in a second direction, which is opposite to said first direction.

13. An electrically powered actuator for controlling a bicycle derailleur, the actuator comprising:
- an elongate, cylindrical casing having a closed first end and an apertured second end;
- an electric motor having a main body housing, an axially-extending cylindrical housing appendix integrally formed with said main body housing, and an output shaft extending axially from said main body housing to a point intermediate said housing appendix;
- a stationary ring sear formed on the interior cylindrical surface of said housing appendix and coaxial with said output shaft;
- a driven shaft having an internal end rotationally mounted within said casing and an external end extending through the apertured second end;
- a reducer inside said housing appendix connecting said output shaft to the internal end of said driven shaft;
- a rotary potentiometer mounted within said casing intermediate the apertured second end and said reducer; and
- a means for sealing the apertured second end to prevent fluid infiltration along said driven shaft;
- wherein said driven shaft is rotationally mounted by means of a thrust bearing which prevents axial movement of said shaft in one direction and a ball bearing which prevents axial movement of said shaft in a second direction opposite said first direction, said thrust bearing having a race formed directly on said driven shaft, and said ball bearing having a snap ring mounted on said driven shaft.

14. The actuator of claim 13 wherein the reducer comprises:
- an internal gear connected to the motor body;
- a sun gear connected to said output shaft coaxially inside said internal gear; and,
- a gear set holder rotationally connected to said driven shaft including at least one satellite gear freely turning on an axis distanced from the common axis of the sun gear and internal gear, said satellite gear meshing with both the sun gear and said internal gear.

15. The actuator of claim 13 wherein said potentiometer comprises a fixed plate having radially-spaced, electrical contact tracks, and a rotating plate on said driven shaft having contact brushes which engage said contact tracks.

16. The actuator of claim 15 wherein said rotating plate being fixed on said driven shaft by a snap ring mounted on said driven shaft.

17. An electrically powered actuator for controlling a front or rear bicycle derailleur, comprising:
- an elongate casing having a closed first end and an aperture in a second end;
- an electric motor having a housing mounted proximate the closed end of said casing, and an output shaft extending axially from said housing towards the second end of said casing;
- a driven shaft having an internal end rotationally mounted within said casing and an external end extending through the aperture in the second end of said casing;
- reducer gear means connecting said output shaft and the internal end of said driven shaft;
- a rotary potentiometer for detecting the position of said driven shaft, said rotary potentiometer being mounted within said casing intermediate the second end of said casing and said reducer means; and,
- means for sealing the second end of said casing around said driven shaft to prevent infiltration of water into said casing;
- wherein said sealing means comprises an seal interposed between said driven shaft and said casing, and axially located intermediate said potentiometer and said second end of said casing.

18. An electrically powered actuator for controlling a front or rear bicycle derailleur, comprising:

an elongate casing having a closed first end and an aperture in a second end;

an electric motor having a housing mounted proximate the closed end of said casing, and an output shaft extending axially from said housing towards the second end of said casing;

a driven shaft having an internal end rotationally mounted within said casing and an external end extending through the aperture in the second end of said casing;

reducer gear means connecting said output shaft and the internal end of said driven shaft;

a rotary potentiometer for detecting the position of said driven shaft, said rotary potentiometer being mounted within said casing intermediate the second end of said casing and said reducer means; and, means for sealing the second end of said casing around said driven shaft to prevent infiltration of water into said casing; and a tubular bushing fastened within the second end of said casing.

19. The actuator of claim 17 wherein said sealing means comprises a first elastomeric seal interposed between said driven shaft and said bushing, and a second elastomeric seal interposed between said bushing and said casing.

* * * * *

UNITED STATES PATENT AND TRADEMARK OFFICE
CERTIFICATE OF CORRECTION

PATENT NO. : 6,676,554 B2
DATED : January 13, 2004
INVENTOR(S) : Giuseppe Dal Pra'

It is certified that error appears in the above-identified patent and that said Letters Patent is hereby corrected as shown below:

Column 4,
Line 35, after the word "internal", delete "sear and as sear" and insert therefor -- gear and a gear --.

Column 6,
Line 4, after the word "ring", delete "sear" and insert therefor -- gear --.

Column 8,
Line 11, after the word "claim", delete "17" and insert therefor -- 18 --.

Signed and Sealed this

Twentieth Day of July, 2004

JON W. DUDAS
*Acting Director of the United States Patent and Trademark Office*